United States Patent [19]

Clavenna et al.

[11] Patent Number: 5,395,406
[45] Date of Patent: Mar. 7, 1995

[54] STRUCTURALLY MODIFIED ALUMINA SUPPORTS, AND HEAT TRANSFER SOLIDS FOR HIGH TEMPERATURE FLUIDIZED BED REACTIONS

[75] Inventors: LeRoy R. Clavenna; Stephen M. Davis, both of Baton Rouge, La.; Rocco A. Fiato, Basking Ridge, N.J.; Geoffrey R. Say, Baton Rouge, La.

[73] Assignee: Exxon Research and Engineering Company, Florham Park, N.J.

[21] Appl. No.: 60,371

[22] Filed: May 11, 1993

[51] Int. Cl.$^6$ .............. C01F 7/18; B01J 23/58
[52] U.S. Cl. .............. 48/198.7; 252/373; 423/600; 423/651; 502/328; 502/332; 502/334; 502/336; 502/337
[58] Field of Search .......... 48/198.1, 198.7, 199 FM; 423/651, 652, 653, 415 A, 600, 654; 252/373; 502/328, 332, 334, 336, 337; 518/704, 717, 721

[56] References Cited

U.S. PATENT DOCUMENTS

| | | | |
|---|---|---|---|
| 3,907,708 | 9/1975 | Lacroix | 502/336 X |
| 4,116,808 | 9/1978 | Cronaver et al. | 208/422 |
| 4,233,186 | 11/1980 | Duprez et al. | 502/329 X |
| 4,268,702 | 5/1981 | Duprez et al. | 585/411 |
| 4,456,703 | 6/1984 | Aldridge | 502/335 |
| 4,492,678 | 1/1985 | Yoo et al. | 423/244 |
| 4,870,044 | 9/1989 | Kukes et al. | 502/328 X |
| 4,988,661 | 1/1991 | Arai et al. | 502/328 X |
| 5,214,227 | 5/1993 | Zhou et al. | 585/660 |
| 5,219,816 | 6/1993 | Zhou et al. | 502/223 |

Primary Examiner—Robert J. Warden
Assistant Examiner—Robert Carpenter
Attorney, Agent, or Firm—Llewellyn A. Proctor; Jay Simon

[57] ABSTRACT

A structurally modified alumina useful as a catalyst support, or heat transfer solid for fluidized bed synthesis gas processing. A Group IIA metal, or metals, particularly magnesium and barium, is composited with a particulate alumina to provide a catalyst support, or alumina heat transfer solid, having increased resistance to sintering and agglomeration; properties which promote defluidization of the bed in conducting fluidized bed reactions at high temperatures. The particles of preference are represented by formulas (1) and (2), a composite particle being represented by formula (1), as follows:

$$M_xAl_2O_{3+x} \qquad (1)$$

with the core of the particle being represented by formula (2), as follows:

$$M_yAl_2O_{3+y} \qquad (2)$$

where in formulas (1) and (2) M is a Group IIA metal, x is a number ranging from about 0.01 to about 0.4 and is representative of the number of moles of the metal M per mole of Al$_2$O$_3$ y is a number equal to or greater than zero, and x is greater than y.

17 Claims, 1 Drawing Sheet

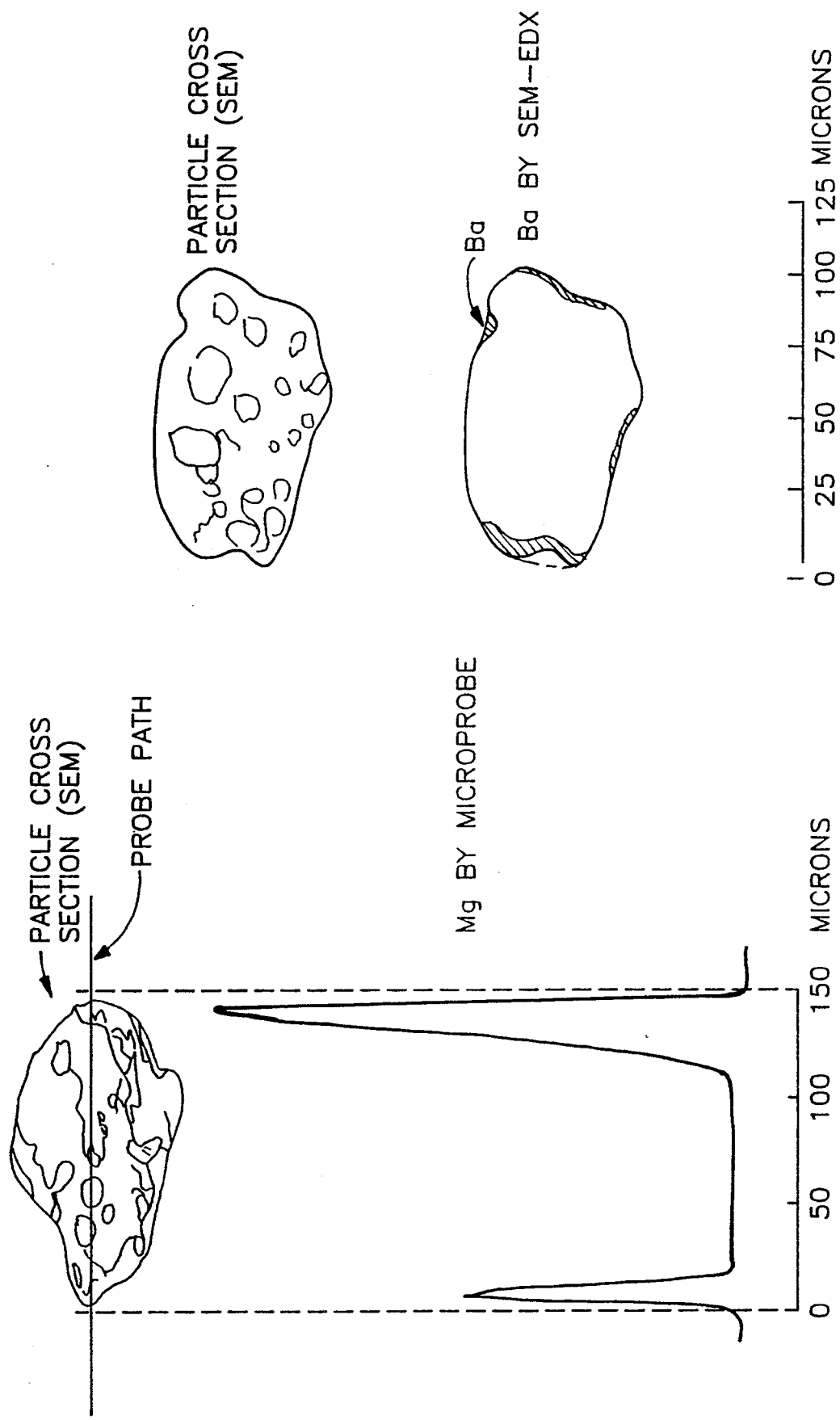

STRUCTURALLY MODIFIED ALUMINA SUPPORTS, AND HEAT TRANSFER SOLIDS FOR HIGH TEMPERATURE FLUIDIZED BED REACTIONS

SPECIFICATION

1. Field of the Invention

This invention relates to a structurally modified alumina composition, or article of manufacture, characterized as a catalyst support, or heat transfer solid, and to the combination of said heat transfer solid in admixture with a catalyst, or catalysts, to provide a fluidizable contact mass for conducting chemical reactions at high temperature, oxidizing, reducing and hydrothermal conditions, especially synthesis gas generation. It also relates to processes for the production of these compositions, and for the use of these compositions for conducting high temperature fluidized bed synthesis gas operations.

2. Background

Particulate refractory inorganic oxide solids, e.g., alumina, have been employed for many years as catalyst supports, or carriers, in natural or synthetic form. For example, synthesis gas, or syn gas (hydrogen and carbon monoxide), is produced from low molecular weight hydrocarbons, primarily methane, reacted in the presence of steam (steam reforming process) or oxygen (partial oxidation process), or both steam and oxygen, at high temperature within a fluidized bed of catalyst, e.g., nickel on an alpha alumina support. Suitably, particulate refractory inorganic oxide solids, notably alpha alumina solids, are admixed with the catalyst, or catalysts, of the fluidized bed as heat transfer solids to control the temperature of reaction. Processes utilizing the admixtures of catalysts and heat transfer solids in reacting low molecular weight hydrocarbons in the presence of both steam and oxygen, it has been found, have provided overall high thermal efficiencies in the production of syn gas.

Certain particulate refractory inorganic oxide solids as heat transfer materials are more resistant than others to melting and agglomeration at the severe high temperature oxidizing and reducing conditions encountered in fluidized bed syn gas generation processes. These particulate refractory inorganic oxides permit substantially isothermal reactor conditions in conducting such reactions, at least so long as they resist melting and agglomeration which leads to reduced fluidization quality, gas bubbles of increased size, and inferior mass transfer. Moreover, the mechanical strength of some particulate solids is greater than others, and in any process the particles must be sufficient to withstand the stress and strain of process operations. An important pathway to loss of fluidization relates to particle degradation through mechanical attrition and break up of the particles to produce fines. The amount of mechanical fracturing and attrition of the particles that can be tolerated during the operation is necessarily limited, and in any process some of the solids particles will be swept from the bed by the ascending fluidization gas, or gases. Whereas cyclone separators can be used to return major concentrations of the solids particles to the bed, no cyclone separator, or system of cyclone separators can be operated with one hundred percent efficiency. Albeit other means may exist for obtaining a more complete separation of particulate solids from the effluent, the cost of such facilities are burdensome. Hence, in most economically viable processes a significant amount of the particulate solids escapes to the atmosphere. Make up solids must therefore be added to the reactor to compensate for this loss; this loss not only representing waste, but possibly a pollution problem.

Sintering and agglomeration of the fluidized bed solids have been found particularly important pathways for fluidized bed degradation, and loss of catalyst activity in fluidized bed operations. Surface impurities, notably such impurities as silicon, boron, sodium, iron, calcium and titanium, especially silicon and boron, in the outer surface of the particles, are found to promote surface melting and agglomeration of the particles in fluidized bed operations. It is believed that surface impurities form, or contribute to the formation of, surface compounds which exhibit reduced melting points relative to the normal melting point of the particulate bed solids. Hot spots, particularly as occurs in the zones of oxygen injection, contribute to and produce sintering and agglomeration of the particles. The temperatures in these zones far exceed the normally high temperature of reaction outside these zones, often by several hundred Fahrenheit degrees. Surface melting of the particles, for any reason whatever, creates a tendency of the particles to fuse, or stick together to form agglomerates; and agglomeration of the particulate solids promotes defluidization of the bed. Albeit there are a few catalyst supports, and heat transfer solids which stand out as exceptional in a relative sense, no particulate refractory oxide solid is now known which possesses the combination of properties which would render it a heat transfer solid capable of completely withstanding sintering, agglomeration and attrition to the desired degree at the extreme conditions encountered in commercial fluidized bed syn gas operations, particularly commercial fluidized bed syn gas operations at extreme hydrothermal conditions. Thus, there exists an acute need for further improving and maintaining the fluidization characteristics of the bed, or beds, employed in fluidized bed synthesis gas manufacturing.

DESCRIPTION OF THE INVENTION

The present invention relates to structurally modified particulate alumina supports useful for the production of catalysts, and heat transfer solids compositions which have improved sintering resistance and agglomeration resistance; and process utilizing these compositions in fluidized beds to promote improved fluidization characteristics, particularly in the production of syn gas at high temperature in the presence of steam, or oxygen, or both steam and oxygen, to wit:

(a) A catalyst support, or heat transfer solid constituted of particulate alumina solids, particularly alpha alumina solids, modified by compositing therewith an effective amount of a Group IIA metal, or metals, of the *Periodic Table of the Elements* (Sargent-Welch Scientific Company, Copyright 1968) or the oxide, or oxides, of said metal, or metals, particularly magnesium and barium which are preferred. The structurally modified alumina particles can be represented by formulas (1) and (2), the composite, or overall particle by formula (1), as follows:

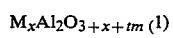

$$M_xAl_2O_{3+x+tm} \quad (1)$$

and the core, or central portion of the particle by formula (2), as follows:

$$M_y Al_2 O_{3+y} \qquad (2)$$

where, in formulas (1) and (2) M is a Group IIA metal, preferably magnesium or barium, x is a number ranging from about 0.01 to about 0.4, more preferably from about 0.03 to about 0.3, x represents the number of moles of the metal M per mole of $Al_2O_3$, i.e. the molar ratio of $M/Al_2O_3$, y is a number equal to or greater than 0, and x is greater than y. The core and the outer layer of a particle are distinguishable, the points of transition between the core and outer layer of a composite particle being defined as those locations where x becomes greater than y.

The particulate solids forming the catalyst support, or heat transfer solid, is of fluidizable particle size distribution, and of average diameter ranging from about 30 microns to about 150 microns, preferably from about 60 microns to about 90 microns. The solids particles constituting the catalyst support, or heat transfer solid can be formed as discrete solids particles or as aggregates wherein a plurality of the solids particles are collected and held together in a mass of size representative of the sum-total of the composite of the individual particles of the mass. Generally, particles of average diameter greater than about 0.01 microns, preferably of average diameter ranging from about 0.1 microns to about 25 microns, are used in forming the aggregates; and preferably the average diameters of the aggregate particles range from about 30 microns to about 150 microns, preferably from about 60 microns to about 90 microns.

(b) A catalyst, the particulate structurally modified alumina solids of (a), supra, of which is composited with a catalytic metal, or metals component, suitably nickel, iron, platinum, ruthenium or the like. Of the catalytic metals nickel is preferred.

(c) A process for the production of hydrogen and carbon monoxide from a low molecular weight hydrocarbon by contact with a fluidized bed constituted of the catalyst of (b), supra, or admixture of a catalyst, or catalysts, and the heat transfer solids of (a), supra.

(d) A process for the preparation of the particulate heat transfer solids of (a), supra, or catalysts of (b), supra. In its preferred aspects, the heat transfer solid is prepared by impregnation of a preformed particulate alumina, or alumina previously dried and calcined after having been extruded, pressed, pilled, pelleted, beaded, then crushed, ground and classified, spray dried or otherwise formed and shaped to the desired particle size distribution and then contacted with a solution, or solutions, of a compound or salt of a Group IIA metal, or metals, to deposit the compound or salt onto the outer surface of the particles to form the composite particles described by formulas (1) and (2), supra.

This invention, and its principle of operation, will be more fully understood by reference to the following detailed description of specific and preferred embodiments, examples, and to the attached drawings to which reference is made in the examples.

REFERENCE TO THE DRAWINGS

FIG. 1 depicts in cross-section a particle of tabular alpha alumina structurally modified with magnesium, examined by scanning electron microscopy (SEM) as described by reference to Example 5. The microprobe analysis across the diameter of the particle shows that the magnesium is concentrated near the outer surface of the particle.

FIG. 2 depicts in cross-section a particle of tabular alpha alumina modified with barium as described by reference to Example 5. The particle is viewed via scanning electron microscopic analysis; the presence and location of the barium being enhanced via energy dispersive x-ray (SEM-EDX) analysis. Again, it is shown that the barium is dispersed near the outer surface of the particle.

It has been found that structural modification of the outer surface of the catalyst support or heat transfer solids particles with an effective amount of the Group IIA metal, or metals, as characterized in (a), supra, lessens or suppresses the normal tendency of the particles to sinter and agglomerate even when the particles contain surface impurities in concentrations sufficient to promote, or produce sintering and agglomeration of the particles at normal syn gas operating conditions. Thus, e.g., surface modification of the particles with the Group IIA metal, or metals, lessens, inhibits, or suppresses the normal tendency of the particles to sinter and agglomerate at syn gas operating conditions even when the outer surface of the particles contain such known impurities as silicon and boron.

Exemplary of the metals useful for the practice of this invention in forming the catalyst support or heat transfer solid as characterized in (a), supra, are magnesium, strontium and barium, of which magnesium and barium are particularly preferred. These metals can be surface composited onto the alumina in effective amounts generally via such methods as ion-exchange, impregnation, spray-coating, spray drying and the like; suitably from a solution, or solutions, preferably from an aqueous solution of a compound or salt of the metal, e.g. magnesium nitrate, magnesium oxalate, magnesium acetate, barium carbonate, magnesium chloride, or the like.

An alumina meeting the requirements of formulas (1) and (2), supra, is one wherein the concentration of the Group IIA metal, or metals, is greater at, or near, the outer or exterior surface of the solids particles (as opposed to the interior surface); and greater at the outer or exterior surface than present throughout the total of the particulate solids. The surfaces of the particulate alumina solids meeting the requirements of formulas (1) and (2), in other words, are structurally modified by the addition thereto of a relatively high concentration of the Group IIA metal, or metals, whereas in contrast a relatively small concentration of the Group IIA metal, or metals, if any, is added to the core, or center of the particles. The outer surface of an alumina particle is thus provided with a rim, coating, or outer surface layer surrounding a core, within which the Group IIA metal, or metals, is present in greatest concentration. The overall particle morphology of the parent alumina is largely retained, but the Group IIA metal modified particles display significant differences relative to the parent alumina in high temperature oxidizing, reducing and hydrothermal environments. The Group IIA metal modified particles provide greatly improved resistance to sintering and agglomeration, particularly in fluidized bed syn gas manufacturing operations. The tendency of the Group IIA metal modified particles to sinter and agglomerate at fluidized bed syn gas processing conditions is greatly reduced vis-a-vis particles otherwise similar except that they are untreated and are subjected to similar processing conditions. Whereas the mechanism for this phenomenon is unknown it is possible that the Group IIA metals form surface compounds which exhibit increased melting points relative to the untreated particulate oxide solid.

The Group IIA metal, or metals, as suggested, can be added to the surface of the alumina particles by various methods, suitably, e.g. by ion-exchange, impregnation, or spray-coating the Group IIA metal, or metals, onto the surface of the particles. In the ion-exchange and impregnation methods the preformed particulate alumina solids are contacted with a solution, or solutions, suitably an aqueous solution containing the desired Group IIA metal compound, or salt, and ion-exchanged or the solution imbibed into the particles. In the impregnation method, e.g. particulate alpha alumina solids are immersed and soaked in a solution which contains a salt or soluble compound of the Group IIA metal, suitably a nitrite, nitrate, acetate, carbonate or the like of magnesium, or barium, for a time sufficient to impregnate sufficient of the solution into the outer surface of the particles to provide the desired metallic loading. The particulate solids are then dried, and calcined. If more than one Group IIA metal is to be introduced into the solids, solutions containing salts of each metal may be introduced simultaneously, or sequentially by treatment with different solutions.

Spray coating can be used to coat a preformed alumina by spraying the heated particles with a heat decomposable Group IIA metal compound, or compounds, to deposit and coat the solids particles with said Group IIA metal, or metals. A spray drying technique can be employed by preparing a slurry of alpha $Al_2O_3$ solids, admixing same with a binder and a solution of the desired Group IIA metal compound, or salt, to form a sprayable paste, and spray drying the paste to form a fluidized bed of the composite particles. Composite particles of this type are agglomerates, the individual component particles of which, though affixed together, are surface coated with the Group IIA metal, or metals, to conform with formulas (1) and (2), supra. The agglomerated particles are then dried and calcined. Alternatively, the alumina paste can be spray dried without addition of the Group IIA metal compound, or salt, to form a particulate alumina, the composite alumina particles calcined, and the particles then impregnated with the Group IIA metal, or salt, and the particles then dried, and again calcined. Hollow spheres of fused alumina, or shells of spray dried alumina surrounding a void space, the solids particles portion of which has been surface coated with the Group IIA metal, or metals, have been found particularly useful as catalyst supports, or heat transfer solids for fluidized bed syn gas operations.

In certain of its embodiments, the present invention is one comprising a heat transfer component, or an admixture of, as a heat transfer component, the Group IIA metal modified particulate alumina and a catalyst. The particles are of fluidizable sizes, the average particle diameter of both the heat transfer component and catalyst ranging from about that they are 30 microns to about 150 microns, preferably from about 60 microns to about 90 microns. The catalyst component of the admixture can be a support, or carrier, notably a refractory inorganic oxide, particularly alumina, with which is composited a metal, or metals, e.g., nickel, iron, ruthenium, platinum, or the like, catalytic for the production of hydrogen and carbon monoxide from low molecular weight hydrocarbons contacted with a fluidized bed of the catalyst at high temperature hydrothermal conditions. Suitably the catalyst is a nickel-on-alumina catalyst, and preferably a nickel-on-alpha alumina catalyst, of particle size distribution corresponding to that of the heat transfer component. The catalyst per se of this invention, and the preferred catalyst for use in said admixture, is one comprising a composite of one or more of said catalytic metals, preferably nickel, and a particulate Group IIA metal modified alumina support.

The catalyst of this invention contains preferably from about 1 percent to about 20 percent nickel, more preferably from about 5 percent to about 10 percent nickel, composited with the Group IIA metal modified alumina support, preferably a Group IIA metal modified alpha alumina support.

An admixture constituted of from about 10 percent to about 99.9 percent, preferably from about 80 percent to about 99.5 percent, of said particulate heat transfer solid, and from about 0.1 percent to about 90 percent, preferably from about 0.5 percent to about 20 percent, of a catalyst, based on the total weight of the admixture, can be fluidized at temperatures ranging to about 2600° F. (1427° C.), particularly at temperatures ranging between about 1600° F. and 2000° F. (871° C. and 1093° C.), and contacted with a low molecular weight hydrocarbon, e.g., $C_1$-$C_4$ alkanes, predominantly methane, in the presence of steam, or oxygen (air), or both steam and oxygen (air), to produce syn gas without significant sintering and agglomeration of the particulate solids components of the admixture. There is no significant disintegration of the catalyst of this invention or of the heat transfer solids component of the admixture to fines, or degradation of the catalyst and heat transfer solids particles of the admixture to agglomerates. In short, both the catalyst of this invention and heat transfer solids of this invention are highly resistant to sintering, attrition and agglomeration per se, and the heat transfer solids of this invention impart high resistance to sintering and agglomeration to even the more conventional catalysts when used in said admixtures.

The invention, and the principle of operation, will be better understood via reference to the following examples which illustrate specific and preferred embodiments. All parts are in terms of weight except as otherwise specified.

EXAMPLE 1

Several specimens of alumina, spanning a wide range of initial structure and morphology, of nominal purity greater than 98.5 percent, of particle diameter ranging between 45 and 106 micrometers, were obtained from several commercial suppliers; A, B, C, D, E, F, and G. The alumina specimens, which were found to exhibit significant differences in agglomeration behavior in fixed bed sintering tests designed to simulate agglomeration tendency in fluidized bed synthesis gas generation, are listed in Table 1.

TABLE 1

| Starting Alumina Materials for Structural Modification | | |
|---|---|---|
| ALUMINA | INITIAL STRUCTURE | MORPHOLOGY |
| A | calcined alumina trihydrate | granular/microporous |
| B | alpha alumina | tabular |
| C | alpha alumina | spray dried |
| D | alpha alumina | spray dried |
| E | alpha alumina | hollow spheres |
| F | alpha alumina | hollow spheres |

TABLE 1-continued

| Starting Alumina Materials for Structural Modification | | |
|---|---|---|
| ALUMINA | INITIAL STRUCTURE | MORPHOLOGY |
| G | alpha alumina | tabular |

The particulate alumina specimens, in portions weighing about 50–100 gms, were structurally modified with Group IIA metals. The alumina specimens were thus impregnated with aqueous solutions of Group IIA metal salts, i.e. magnesium nitrate, strontium nitrate and barium nitrate, using the incipient wetness impregnation technique, followed by drying at ambient temperature for 16–36 hours, drying in vacuum at 100° C. for 16–36 hours, and calcination in air at 1000° C. to 1200° C. for at least four hours. Loadings ranged in the 1% to 9% range, based on the weight of metal contained within the total specimen (dry basis); loadings below the amount of metal required to form a metal aluminate, $MAl_2O_4$.

EXAMPLE 2

Each of the starting aluminas, for comparative purposes, and corresponding Group II structurally modified aluminas were investigated for agglomeration resistance in a fixed bed sintering test. In this test, an 8–10 gr sample of the 45–106 μm particulate oxide was distributed in a small Coors alumina boat. The sample was placed in a high temperature furnace and heated from room temperature to a maximum temperature of 3000° F. (1649° C.) over a period of several hours. The sample was then held at the maximum temperature for 2 to 16 hours to induce thermal sintering and agglomeration. The sample was then cooled to about 200° F. (93° C.) over a period of 6–12 hours and removed from the oven. The sample was then transferred to a sonic sieve operated at a constant power level, and the conversion of 45 to 106 μm particles to fused aggregates greater than 106 μm in size was measured by weighing the fraction collected on a 150 mesh size screen.

Table 2 summarizes the agglomeration results for the various materials investigated. In essentially all cases, it is seen that addition of the Group II metal resulted in significant improvements in alumina agglomeration resistance.

TABLE 2

| Agglomeration Results for Structurally Modified Aluminas | | |
|---|---|---|
| | AGGLOMERATION, WT. % > 106 μm FORMED | |
| MATERIAL | 3 HOURS AT 3000° F. (1649° C.) | 16 HOURS AT 3000° F. (1649° C.) |
| A | 20 | — |
| 4% Mg/A | 9 | — |
| 8% Mg/A | 9 | — |
| B | 17 | — |
| 2% Mg/B | 0.8 | — |
| 2% Ba/B | 2 | — |
| C | 0.6 | 30 |
| 3% Mg/C | 0.5 | 33 |
| 3% Ba/C | 0.3 | 1.4 |
| D | 3.4 | — |
| 3% Mg/D | 0.4 | — |
| 3% Ba/D | 0.2 | — |
| E | 40 | 72 |
| 1% Mg/E | 11 | 81 |
| 2% Mg/E | 0.8 | 20 |
| 3% Mg/E | 1.6 | 26 |
| 1% Ba/E | 1.2 | 39 |
| 3% Ba/E | 1.2 | 0.4 |
| 2.2% Sr/E | 2.9 | 3.6 |
| 4.3% Sr/E | 1.4 | 1.6 |

TABLE 2-continued

| Agglomeration Results for Structurally Modified Aluminas | | |
|---|---|---|
| | AGGLOMERATION, WT. % > 106 μm FORMED | |
| MATERIAL | 3 HOURS AT 3000° F. (1649° C.) | 16 HOURS AT 3000° F. (1649° C.) |
| 8.6% Sr/E | 1.5 | 2.0 |
| F | 31/20* | 62 |
| 3% Mg/F | 4 | 62 |
| 4% Mg/F | 6* | — |
| 3% Ba/F | — | 0.7 |
| G | 90 | 96 |
| 1.6% Mg/G | 2 | 28 |
| 2.2% Sr/G | 0.4 | 0.4 |
| 4.3% Sr/G | 0.6 | 0.6 |
| 8.6% Sr/G | 1.2 | 1.8 |

*test carried out for 2 hours rather than 3

EXAMPLE 3

Tests were conducted using high purity magnesium aluminate spinel materials obtained from appropriate commercial manufacturers; H, I, J, K and B. These were tabular materials with uniform magnesium concentrations throughout the particle that were produced by co-firing aluminum and magnesium oxide gels at temperatures above 3000° F. (1649° C.) prior to grinding to produce the particulate spinel materials. Table 3 summarizes agglomeration results for these prior art materials in comparison to an alpha alumina which was structurally modified by Mg-impregnation. The tabular spinels provided inferior agglomeration resistance, while high agglomeration resistance is provided by the doped alumina of manufacturer B.

TABLE 3

| Agglomeration Behavior of Magnesium Aluminate Spinels | | |
|---|---|---|
| MATERIAL | Mg-CONTENT (wt %) | AGGLOMERATION, WT. % > 106 μm @ 3000° F. (1649° C.) |
| H - spinel | 17 | 94 |
| I - tabular spinel | 6 | 33 |
| J - tabular spinel | 13 | 98 |
| K - tabular spinal | 20 | 96 |
| B - tabular alumina | — | 17 |
| 2% Mg/B - tabular alumina | 2 | 1 |

EXAMPLE 4

Examination of the data given by Tables 2 and 3, plotting relative agglomeration resistance versus magnesium loading suggests a generally optimum level of magnesium addition. If the composite material is represented by the of about 0.07 to 0.14. As shown in Table 2, strontium shows a similar optimum. It formula $Mg_xAl_2O_{3+x}$, this optimum appears to occur for values of x in the range is expected that barium would show generally similar results.

EXAMPLE 5

The structurally modified aluminas were characterized using a variety of methods such as powder X-ray diffraction and various types of electron microscopy. X-ray diffraction results showed that the impregnation of Group IIA metal salts followed by calcination resulted in the appearance of new diffraction features. In general, the positions of these new diffraction lines agreed closely with those expected for spinel compounds such as $Mg_xAl_2O_{3+x}$, $Ba_xAl_2O_{3+x}$, etc. However, electron microscopy data also revealed that the Group II additive was characterized by a non-uniform (rim-type) distribution where most if not all of the Group II additive was concentrated in the near, or outer surface region of the particle or in the surface region of the individual grains which comprised composite spray dried particles. Referring to FIG. 1, e.g., there is depicted in cross-section a particle of tabular alumina modified with magnesium, as it appears via scanning electron microscopic analysis. Also, there is depicted in FIG. 2 an exemplary electron micrograph for a barium doped tabular alumina. It is apparent from these elemental "maps" that the Group IIA metals, e.g. barium, strontium and magnesium, are concentrated in a rim like surface layer and not uniformly distributed throughout the bulk of the particle.

The following exemplifies the effect of magnesium impregnated into alpha alumina spheres containing titanium and calcium impurities as regards the suppression of the alpha alumina to agglomerate at high temperature.

EXAMPLE 6

Mg was impregnated to a 0.7 wt. % level onto alpha alumina spheres containing 0.5 wt. % Ti and 0.5 wt. % Ca as impurities. The tendency of the Mg-impregnated alpha alumina particles to agglomerate, utilizing the test procedure described in Example 2, was compared with particles similar in all respects except that the particles were not impregnated with Mg, i.e. a stock sample, as shown in Table 4. The high agglomeration of the stock sample, as shown by these comparative data, results from the presence of Ti and Ca impurities. The addition of Mg, as is apparent, counteracts their effect to give a reduced agglomeration.

TABLE 4

Mg Addition Reduces Agglomeration

| Sample | AGGLOMERATION AT 3 HRS., WT, % > 106 μm | | |
|---|---|---|---|
| | 2800° F. (1538° C.) | 2900° F. (1593° C.) | 3000° F. (1649° C.) |
| Stock | 93 | 95 | 99 |
| 0.7 Wt. % Mg on Stock | 2 | 28 | 69 |

The procedure used for the agglomeration test is as described in Example 2.

Having described the invention, what is claimed is:

1. A composition of matter which comprises
a support components comprising particulate alpha alumina solids of fluidizable particle size of 30–150 microns modified by compositing a metal therewith to form particles represented by formulas (1) and (2), a composite particle being represented by formula (1), as follows:

$$M_xAl_2O_{3+y} \qquad (1)$$

with the core of the particle being represented by formula (2), as follows:

$$M_yAl_2O_{3+y} \qquad (2)$$

where in formulas (1) and (2)
M is a Group IIA metal, x is a number ranging from about 0.01 to about 0.4 and is representative of the number of moles of the metal M per mole of $Al_2O_3$, y is a number equal to or greater than zero, and x is greater than y.

2. The composition of claim 1 wherein the Group IIA metal is magnesium, strontium, or barium.

3. The composition of claim 2 wherein the composite particles are of average diameter ranging from about 60 microns to about 90 microns.

4. The composition of claim 3 wherein the composite particles are aggregates of smaller particles of diameter ranging from about 0.1 micron to about 25 microns.

5. The composition of claim 1 wherein the particulate alumina solids are composited with a catalystic metal to form a catalyst, and the catalytic metal component of the catalyst is selected from the group consisting of nickel, iron, platinum, and ruthenium.

6. The composition of claim 5 wherein the catalytic metal composited with the alpha alumina support comprises nickel.

7. The composition of claim 6 wherein the nickel component of the catalyst is composited with the support in concentration ranging from about 1 percent to about 20 percent, based on the total weight of the composite.

8. The composition of claim 7 wherein the nickel concentration of the catalyst ranges from about 5 percent to about 10 percent.

9. The composition of claim 1 which is resistant to sintering and agglomeration in fluidized beds at temperatures of about 1600°–2000° F.

10. In a process for the production of hydrogen and carbon monoxide from a low molecular weight hydrocarbon by contact with a fluidized bed constituted of catalyst and heat transfer solids resistant to sintering and agglomeration at atemperature of about 1600°–2000° F. in the presence of at least one of steam and oxygen, the improvement wherein the heat transfer solids component of the fluidized bed is comprised of
a support component comprising particulate alpha alumina solids of fluidizable particle size of 30–150 microns modified by compositing a metal therewith to form particles represented by formulas (1) and (2), a composite particle being represented by formula (1), as follows:

$$M_xAl_2O_{3+x} \qquad (1)$$

with the core of the particle being represented by formula (2), as follows:

$$M_yAl_2O_{3+y} \qquad (2)$$

where in formulas (1) and (2)
M is a Group IIA metal, x is a number ranging from about 0.01 to about 0.4 and representative of the number of moles of the metal M per mole of $Al_2O_3$, y is a number equal to or greater than zero, and x is greater than y.

11. The process of claim 10 wherein from the Group IIA metal is magnesium, strontium, or barium.

12. The process of claim 11 wherein the composite particles are of average diameter ranging from about 60 microns to about 90 microns.

13. The process of claim 12 wherein the composite particles are aggregates of smaller particles of diameter ranging from about 0.1 micron to about 25 microns.

14. The process of claim 10 wherein the catalyst component of the fluidized bed admixture is selected from the group consisting of nickel, iron, platinum, or ruthenium composited with an alpha alumina support.

15. The process of claim 14 wherein the catalytic metal composited with the alpha alumina support is comprised of nickel.

16. The process of claim 10 wherein the support component of the catalyst of the fluidized bed admixture is one which has been modified by compositing a metal therewith to form particles represented by formulas (1) and (2), a composite particle being represented by formula (1), as follows:

$$M_xAl_2O_{3+x} \quad (1)$$

with the core of the particle being represented by formula (2), as follows:

$$M_yAl_2O_{3+y} \quad (2)$$

where in formulas (1) and (2)
M is a Group IIA metal, x is a number ranging from about 0.01 to about 0.4 and representative of the number of moles of the metal M per mole of $Al_2O_3$, y is a number equal to or greater than zero, and x is greater than y.

17. A process for the preparation of (i) a heat transfer solid resistant to sintering and agglomeration for admixture with a catalyst to form a fluidized bed, (ii) or support with which a catalytic metal, or metals, can be composited to form a catalyst useful as a fluidized bed component, for the conversion of a low molecular weight hydrocarbon to hydrogen and carbon monoxide on contact therewith at elevated temperature in the presence of at least one of steam and oxygen, which comprises modifying particulate alpha alumina solids of fluidizable particle size distribution by compositing a metal therewith to form particles represented by formulas (1) and (2), a composite particle being represented by formula (1), as follows:

$$M_xAl_2O_{3+x} \quad (1)$$

with the core of the particle being represented by formula (2), as follows:

$$M_yAl_2O_{3+y} \quad (2)$$

where in formulas (1) and (2)
M is a Group IIA metal, x is a number ranging from about 0.01 to about 0.4 and representative of the number of moles of the metal M per mole of $Al_2O_3$, y is a number equal to or greater than zero, and x is greater than y.

* * * * *

UNITED STATES PATENT AND TRADEMARK OFFICE
CERTIFICATE OF CORRECTION

PATENT NO. : 5,395,406
DATED : March 7, 1995
INVENTOR(S) : LeRoy R. Clavenna, et al.

It is certified that error appears in the above-indentified patent and that said Letters Patent is hereby corrected as shown below:

In column 2, line 67, the formula:

"$M_xAl_2O_{3+x+tm}$ (1) "

should be deleted and replaced with the formula:

-- $M_xAl_2O_{3+x}$ -- column 9, line 58, the formula

"(1) $M_xAl_2O_{3+y}$"

should be deleted and replaced with the formula:

--(1) $M_xAl_2O_{3+x}$--

Signed and Sealed this

Third Day of October, 1995

Attest:

BRUCE LEHMAN

*Attesting Officer*    *Commissioner of Patents and Trademarks*